United States Patent Office 3,478,084
Patented Nov. 11, 1969

---

3,478,084
LOWER ALKYL α-CARBOALKOXY-β-(3,4-DI-SUBSTITUTED ANILINO) ACRYLATES
Edward F. Rogers, Middletown, Robert L. Clark, Woodbridge, and Arthur A. Patchett, Cranford, N.J., assignors to Merck & Co., Inc., Rahway, N.J., a corporation of New Jersey
No Drawing. Continuation of application Ser. No. 572,225, Aug. 15, 1966. This application Aug. 19, 1966, Ser. No. 573,469
Int. Cl. C07d 33/52; A01n 9/22
U.S. Cl. 260—471                3 Claims

---

ABSTRACT OF THE DISCLOSURE

Novel lower alkyl 4-hydroxy-quinoline-3-carboxylates having a diloweralkylamino radical at the 6-position, and a diloweralkylamino, lower alkyl, alkoxy or haloalkoxy radical at the 7-position are obtained from a 3,4-disubstituted aniline by reacting said aniline with diloweralkyl loweralkoxy methylene malonate and heating the resulting product. These novel quinolates have anticoccidial properties.

---

This application is a continuation of our pending application Ser. No. 572,225 filed Aug. 15, 1966, now abandoned which application is in turn a continuation-in-part of our co-pending application Ser. No. 515,757, filed Dec. 22, 1965, now abandoned.

This invention relates to new chemical compounds. More specifically, it relates to novel 6,7-disubstituted quinoline-3-carboxylates. Still more specifically, it is directed to certain loweralkyl 6-substituted-amino-7-substituted-4-hydroxy-quinoline-3-carboxylates, their method of preparation and their use as coccidiostats. It is also concerned with novel anticoccidial compositions containing these carboxylates as an active ingredient.

Coccidiosis is a widespread poultry disease involving the invasion of caecal and intestinal mucosa by coccidia, specifically protozoan parasites of the genus Eimeria. The most important of these species are *E. maxima, E. ascervulina, E. tenella, E. necatrix, E. brunetti, E. praecox* and *E. mitis*. When left untreated, the severe form of the disease leads to poor weight gain, reduced feed efficiency, reduced egg production and high mortality. For these reasons, the control of coccidiosis is highly important to the poultry industry and research designed to discover new more active compounds has continued.

According to the present invention, it has now been found that certain novel loweralkyl 6-substituted amino-4-hydroxy-quinoline-3-carboxylates having an alkyl, alkoxy, haloalkoxy or substituted amino radical at the 7-position are highly effective in the treatment and prevention of coccidiosis. An object of this invention, therefore, is to provide such new chemical compounds. A further object is to provide novel compounds useful as intermediates in preparing such substances. Another object is to provide novel compositions containing them as active anticoccidial ingredients. A still further object is provision of methods of combatting coccidiosis by administering to poultry minor amounts of the anticoccidial substances described herein. Further objects will become evident from the following discussion of the invention.

In accordance with the present invention, there are provided novel compounds represented by the structural Formula I:

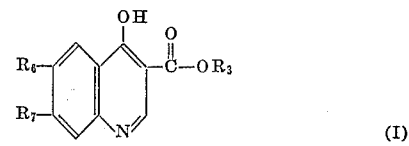

(I)

where $R_3$ is loweralkyl; $R_6$ is a diloweralkylamino radical; and $R_7$ is diloweralkylamino, loweralkyl, alkoxy or haloalkoxy having 2–5 carbon atoms.

In the above formula representing the compounds of this invention, $R_3$ represents a loweralkyl radical such as methyl, ethyl, n-propyl, butyl and isobutyl; $R_3$ is preferably methyl or ethyl. A significant feature of our novel substances is the substituent $R_6$ in Formula I, which represents diloweralkylamino, examples of which are dimethylamino, diethylamino, di-n-propylamino, di-isobutylamino and the like. It is preferred that $R_6$ be either dimethylamino or diethylamino.

$R_7$ in Formula I signifies dialkylamino, alkyl, alkoxy or haloalkoxy having 2–5 carbon atoms. The diloweralkylamino radical is similar to those stated above for $R_6$, and may be the same as or different than $R_6$ in any specific compound; preferably it is dimethylamino or diethylamino. When $R_7$ is alkyl it is most desirably loweralkyl such as methyl, ethyl, butyl and the like. $R_7$ may also be an alkoxy of 2–5 carbons and preferably isopropoxy, isobutoxy or propoxy; when $R_7$ is haloalkoxy, such as haloethoxy, halopropoxy or halobutoxy, it may contain one or more of the halogens, i.e. chloro, bromo, iodo, fluoro, which may be the same or different. In the preferred haloalkoxy radicals the α-carbon is halogenated, and the most preferred are those wherein the α-carbon is difluorinated, and there is at least one hydrogen on the β-carbon. Representative examples of such haloalkoxy radicals are α,α-difluoro-β,β-dichloroethoxy, α,α,β,γ,γ,γ-hexafluoropropoxy, α,α-difluoro-β-bromoethoxy, and the like.

The compounds of this invention which are the most active coccidiostats and which therefore constitute the preferred embodiments of the invention are those wherein the loweralkyl radical $R_3$ has 2–4 carbon atoms; $R_6$ represents diloweralkylamino wherein the loweralkyl radicals have 1–3 carbon atoms; and $R_7$ represents diloweralkylamino, polyfluoro loweralkoxy of 2–4 carbons and especially trifluorochloroethoxy, loweralkoxy of 1–4 carbons or loweralkyl of 2–4 carbons.

Representative examples of the novel compounds of this invention include methyl-4-hydroxy-6-dimethylamino-7 - isopropoxy-quinoline-3-carboxylate, methyl-4-hydroxy-6-dimethylamino-7-isobutoxy-quinoline - 3 - carboxylate, methyl - 4 - hydroxy - 6 - dimethylamino-7-n - pentoxy-quinoline-3-carboxylate, ethyl-4-hydroxy-6-diethylamino-7-n-methoxy-quinoline-3-carboxylate, methyl - 4-hydroxy-6-dimethylamino-7 - ethyl - quinoline - 3 - carboxylate, methyl-4-hydroxy-6-dimethylamino-7-n - propylquinoline-3-carboxylate, methyl (and ethyl) -4-hydroxy-6-dimethylamino-7-diethylamino-quinoline-3 - carboxylate, ethyl-4-hydroxy-6-dimethylamino-7-di-n - propylamino-quinoline-3-carboxylate, ethyl (or methyl) -4-hydroxy-6,7-bis-dimethylamino-quinoline-3-carboxylate, ethyl (or methyl) -4-hydroxy-6,7-bis - diethylamino-quinoline-3-carboxylate, methyl-4-hydroxy-6 - diethylamino - 7 - dimethylamino-quinoline-3-carboxylate, propyl-4-hydroxy-6-di - n-butyl-amino-7-dimethylamino-quinoline-3 - carboxylate, methyl-4-hydroxy-6-di-propyl-amino - 7 - isobutoxy-quinoline-3-carboxylate, methyl - 4 - hydroxy-6-diethylamino-7-isopropoxy-quinoline-3-carboxylate, propyl-4 - hydroxy-6-dimethylamino - 7 - isopropoxy - quinoline-3-carboxylate, methyl (or ethyl) -4-hydroxy-6-diethylamine-7 - ($\alpha,\alpha,\beta$-trifluoro-$\beta$-chloroethoxy)-quinoline-3 - carboxylate, and ethyl-4-hydroxy-6-dimethylamino-7 - ($\alpha,\alpha,\beta$-trifluoro - $\beta$-chloroethoxy)-quinoline-3-carboxylate.

The novel quinolates of this invention are synthesized from a 3-$R_7$-6-$R_6$-aniline compound having the structural Formula II

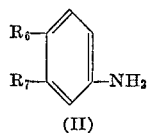

(II)

where $R_6$ and $R_7$ are as defined in Formula I above, by reacting said aniline with a diloweralkyl loweralkoxy methylene malonate of the structure $$R_3OCHC(COOR_3)_2 \qquad (III)$$

where $R_3$ represents a loweralkyl radical. The immediate reaction product is an ester having the structure

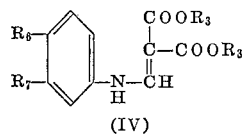

(IV)

where $R_3$, $R_6$ and $R_7$ are as previously defined. The ester (IV) is then converted to a loweralkyl 4-hydroxy-6-$R_6$-7-$R_7$-quinoline-3-carboxylate by heating at elevated temperatures.

The reaction of the aniline (II) with the malonate ester (III) is preferably carried out in an inert solvent medium such as in a loweralkanol, e.g. methanol, ethanol or isopropanol, or an ether such as diethyl ether, dioxane, diethylene glycol, dimethyl ether or ethylene glycol. Essentially equimolar amounts of the reactant are employed although this is not essential and a molar excess of either may be used if desired. Reaction temperatures of from 40–120° C., and preferably 70–100° C., are employed for best results. When the reaction is essentially complete the solvent may be removed by known techniques, and the acid employed directly without further purification in the ring-closure reaction leading to the quinolate (I). This is effected by heating at 200–300° C., and preferably at about 240–270° C., for from about 10–30 minutes. Although not necessary, it is desirable to carry out the reaction in a high-boiling organic solvent such as dimethylsulfone, dodecylbenzene, biphenyl, diphenylether and similar solvents inert under the reaction conditions. At the end of the reaction period the mixture is cooled and the desired loweralkyl 4-hydroxy-6,7-disubstituted-quinoline-3-carboxylate recovered and purified by techniques known to those skilled in this art.

The novel quinoline-3-carboxylates of Formula I above may also be prepared by esterifying the corresponding quinoline-3-carboxylic acid. This process is effected by treating the free acid with a loweralkanol in the presence of a mineral acid such as phosphoric acid, hydrochloric acid, sulphuric acid, and the like. The esterification temperature should be maintained at about 75–150° C., conveniently at about 100° C. for several hours. The acid and excess alkanol may then be removed in vacuo and the residual ester (I) isolated and purified by conventional techniques such as neutralization, extraction into and crystallization from organic solvents.

The compounds of Formula I are also preparable from the corresponding quinoline-3-carboxylic acid halide by reaction of an acid halide such as the acid chloride, with a loweralkanol, e.g. methanol or ethanol, at about 40–160° C. The loweralkyl quinolate is isolated and purified by standard techniques.

The 4-hydroxy-6-$R_6$-7-$R_7$-quinoline-3-carboxylic acids, where $R_6$ and $R_7$ are as previously defined, referred to hereinabove are obtained by heating a loweralkyl ester thereof with a base, such as an aqueous alkali metal hydroxide. The corresponding acid halides, such as 4-hydroxy-6-$R_6$-7-$R_1$-quinoline-3-carbonyl chloride or bromide, are synthesized by reacting the free acid with thionyl chloride or bromide at an elevated temperature of about 60–90° C.

The compounds of Formula I above are highly active in the treatment or prevention of coccidiosis, for which purpose they are administered to poultry as a component of the feed or drinking water. Although every quinoline carboxylate within the purview of this invention does not have the same degree of anticoccidial efficacy, all are very effective. As expected, the amount of compound necessary for adequate control of the disease will vary with the type and severity of infection, the duration of treatment and the particular substance employed.

It is accordingly a further embodiment of this invention to provide novel compositions in which the compounds defined by Formula I are present as an active anticoccidial ingredient. Such compositions comprise these loweralkyl 4-hydroxy-6,7-disubstituted quinoline-3-carboxylates intimately dispersed in or admixed with an inert carrier or diluent. By an inert carrier is meant one that is essentially nonreactive with the active anticoccidial ingredient and that may be administered with safety to the animals. In the case of solid compositions, the carrier or diluent is preferably one that is orally ingestible and that is or may be an ingredient of the animal feed. Preferred drinking water formulations are water-soluble powders, aqueous suspensions, or solutions.

The compositions which are one of the preferred features of this aspect of the invention are feed supplements in which the active anticoccidial ingredient is present in relatively large amounts in a poultry feed additive. Diluents which are normally employed for these animal feed supplements are solid orally ingestible poultry feed additives such as distiller's dried grains, corn meal, wheat shorts, soya grits, wheat standard middlings, oyster shells, citrus meal, crushed limestone, and the like. The preferred diluents are those which have nutritive value to the poultry and are normal ingredients of the finished feed. These supplements are incorporated in the poultry feed either directly or via an intermediate dilution or blending step. These premixes or feed supplements may contain about 2–50% by weight of the active ingredient, although normally the concentration is from 10–30% by weight.

It will be understood that the novel quinoline-3-carboxylates of this invention may be admixed with other coccidiostats such as amprolium, nicarbazin, 2-methyl-3,5-dinitrobenzamide, sulfaquinoxaline and the like, and such compositions are within the purview of this invention.

Examples of typical feed supplements containing a quinoline-3-carboxylate of Formula I above are:

| A | Lbs. |
|---|---|
| Methyl-4-hydroxy - 6,7 - diethylaminoquinoline-3-carboxylate | 20 |
| Corn meal | 80 |

| B | |
|---|---|
| 1-(2-n-propyl-4-amino - 5 - pyrimidylmethyl)-2-methyl pyridinium chloride hydrochloride | 15 |
| Ethyl - 4 - hydroxy-6-diethylamino-7-($\alpha,\alpha,\beta$-trifluoro-$\beta$-chloroethoxy)-quinoline-3-carboxylate | 15 |
| Distiller's dried grains | 70 |

The coccidiostats of this invention are administered to poultry as part of the finished feeds which may be a mash containing ground grain, animal and vegetable proteins, mineral and vitamin concentrates, or a broiler feed containing a large proportion of ground yellow corn together with other nutritive substances such as fish meal, soybean oil meal, meat products, minerals and vitamins. Feed levels of drug of from about 0.0005% to about 0.05% by weight are effective in controlling coccidiosis, with concentrations of about 0.0025% to 0.0125% by weight of feed being preferred of the most active compounds. The higher feed levels are employed when using the compounds therapeutically for relatively short periods of time whereas lower feed levels are preferred when the compounds are used prophylactically. It is desirable to employ the lowest feed level of drug that affords adequate control of the disease. When the active agents are administered by way of the drinking water, somewhat lower levels than those in feed are satisfactory since the birds drink about twice as much as they eat. The use of the active agent in drinking water is made more practically useful by addition to the water of a suspending agent such as acacia, tragacanth, carboxypolymethylene, algins, methylcellulose, hydroxyethylcellulose and others, which promotes even distribution of the water insoluble material.

The 3—$R_7$—4—$R_6$-aniline compounds of Formula II above, which are condensed with a diloweralkyl loweralkoxy methylene malonate according to the process of this invention, are prepared by catalytic reduction of the corresponding 3—$R_7$—4—$R_6$-nitrobenzene in a loweralkanol using a palladium-on-charcoal catalyst. This process is described in the literature with respect to making certain of the anilines of Formula II, and those not specifically described are prepared in a similar fashion.

The 3—$R_7$—4—$R_6$-nitrobenzene reactants, some of which are new compounds, are synthesized in a variety of ways, the method of choice depending upon the particular $R_6$ and $R_7$ substituents in the molecule.

Thus, when $R_6$ is diloweralkylamino, and especially dimethylamino, and $R_7$ is loweralkoxy, the 3—$R_7$—4—$R_6$-nitrobenzene intermediate is obtained from n-nitrophenol by:

(a) Alkylating said phenol with a loweralkyl halide to form 2-alkoxy-nitrobenzene, (b) Reducing this substance catalytically to 2-alkoxy-aniline, (c) Treating said aniline with an alkylating agent such as dimethyl sulfate to form 2-alkoxy-N,N-dimethyl aniline, and (d) Finally nitrosating with a nitrous acid-mineral acid mixture under the usual conditions to obtain 3-alkoxy-4-dimethylamino-nitrobenzene.

When it is desired to prepare a 4-hydroxy-6-dimethylamino-7-haloalkoxy-quinoline carboxylate, the intermediate nitrobenzene is secured by:

(a) Reacting 3-hydroxy-4-amino-nitrobenzene with a haloalkene in the presence of a base such as sodium alkoxide, and in a suitable inert solvent, such as dimethylformamide. The reaction is effected at about 80–100° C. for 4–6 hours in a sealed tube, thereby producing 3-haloalkoxy-4-amino-nitrobenzene. (Many of these haloalkenes are known; others may be prepared by standard methods such as described in the text Chemistry of Organic Fluorine Compounds, Hudlicky, MacMillan & Co., 1962, pp. 128–133.)

(b) This latter substance is then treated with sodium nitrite in cold hydrochloric acid to form a diazonium salt which is reacted without isolation with cuprous chloride to afford 3-haloalkoxy-4-chloronitrobenzene, which is (c) Converted to 3-haloalkoxy-4-dimethylamino-nitrobenzene by reacting it with dimethylamine in methanol in a sealed vessel at about 150° C. for 10–12 hours.

When preparing the 4-hydroxy-6-diloweralkylamino-7-loweralkyl-quinoline-3-carboxylates of the invention, such as the 6-dimethylamine compound, the 3-loweralkyl-4-dimethylamino-aniline starting material is obtained from an o-nitroalkylbenzene by:

(a) Reacting said substance with hydrogen and formaldehyde at superatmospheric pressure in a loweralkanol to produce 2-loweralkyl-N,N-dimethylaniline, (b) Coupling said substance with the diazo salt of 2,5-dichlorobenzene to produce 2,5-dichloro-3'-loweralkyl-4'-dimethylamino azobenzene, and (c) Decomposing this material with aluminium in ethanolic hydrogen chloride at elevated temperature, whereby the 3-loweralkyl-4-dimethylamino aniline is formed directly.

The substances of Formula I where $R_6$ and $R_7$ are both dimethylamino are obtained by catalytically reducing the known 3,4-dimethylamino nitrobenzene to the corresponding aniline and then reacting with the malonate as explained above.

The 3-haloalkoxy-4-dialkylamino-anilines of Formula II (where the dialkylamino radical is other than dimethylamino), are prepared in either of two ways. The first is from the 3-haloalkoxy-4-amino-nitrobenzene by reacting this substance with a diloweralkyl sulfate to afford 3-haloalkoxy-4-diloweralkylamino-nitrobenzene, and catalytically reducing the latter material with hydrogen and a palladium catalyst. The second method comprises:

(a) Treating o-nitrophenol with a haloalkene to obtain 2-haloalkoxy-nitrobenzene, (b) Catalytically hydrogenating to the corresponding aniline, (c) reacting the aniline with a diloweralkyl sulfate, e.g. diethyl sulfate to produce 2-haloalkoxy-N,N-diloweralkyl aniline, (d) Coupling this material with the diazo salt of 2,5-dichloroaniline to afford 2,5-dichloro-3'-haloalkoxy-4'-dialkylamino azobenzene, and (e) Finally decomposing this material with aluminum powder to 3-haloalkoxy-4-dialkylamino aniline.

In order to obtain anilines of Formula II wherein $R_6$ and $R_7$ are both diloweralkylamino other than dimethylamino or where they are different dialkylamino radicals, the following synthesis is preferred:

(a) o-Fluoroaniline is reacted at about 160–200° C. with a triloweralkyl phosphate to give o-fluoro-N,N-dilower alkylaniline;

(b) This material is nitrated by reacting with nitric acid-sulfuric acid for 2 hours at room temperature to form 3-dialkylamino-4-fluoro-nitrobenzene, (c) Which substance is then treated with a diloweralkylamine in aqueous ethanol to yield 3,4-bis-dialkylamino-nitrobenzene, where the two dialkylamino radicals may be the same or different;

(d) This nitrobenzene is catalytically hydrogenated with palladium catalyst to give 3,4-diloweralkylamino aniline.

The following examples are given for the purpose of illustration and not by way of limitation:

EXAMPLE 1

Methyl-4-hydroxy-6-dimethylamino-7-isopropoxy-quinoline-3-carboxylate

To 19 g. of 2-dimethylamino-isopropoxy benzene in 95 ml. of 33% sulfuric acid is added at 12–15° C. 47 g. of sodium nitrite in 2600 ml. of water. After 20 hours the mixture is made basic with sodium hydroxide and extracted with an equal volume of ether. The ether solution is then extracted with 1000 ml. of 2.5 N hydrochloric acid. The acidic extract solution is made basic with sodium hydroxide and extracted with 3 × 500 ml. of ether. The combined ether extracts are evapoarted to dryness to give 3-isopropoxy-4-dimethylamino-nitrobenzene.

When the above process is carried out on 2-dimethylamino-ethoxy benzene and 2- dimethylaminoisobutoxybenzene there is obtained 3-ethoxy or 3-isobutoxy-4-dimethylamino-nitrobenzene. The 2-dimethylamino-alkoxy benzenes are obtained by N-alkylation of 2-alkoxy aniline with dialkylsulfate using standard procedures.

8. g. of 3-isopropoxy-4-dimethylamino nitrobenzene is hydrogenated in 100 ml. of methanol using 0.5 g. of 5% palladium on charcoal as catalyst. The catalyst is removed by filtration and the produced 3-isopropoxy-4-dimethylamino aniline product is isolated by evaporating the solvent, dissolving the residue in ether, washing the ether solution with sodium bicarbonate and with water, and finally evaporating the ether to dryness. 3-ethoxy and 3-isobutoxy-4-dimethylamino aniline are obtained in similar fashion from 3-ethoxy and 3-isobutoxy-4-dimethylamino nitrobenzene.

To 3 g. of 3-isopropoxy-4-dimethylamino aniline in 30 ml. of ethanol there is added 4.5 g. of dimethylmethoxy methylene malonate. The solution is heated on a steam bath for 4 hours to give methyl α-carbomethoxy-β-(3-isopropoxy-4-dimethylamino anilino)-acrylate. The solvent is evaporated and the residual product is then added directly to 180 ml. of dodecylbenzene at 250° C. and the mixture maintained at that temperature for about 30 minutes. The solid that separates is crystallized from absolute ethanol to give methyl-4-hydroxy-6-diethylamino-7-isopropoxy-quinoline-3-carboxylate; M.P. 262–264° C.

When the above metthod is repeated using diethylethoxy methylene malonate instead of dimethylmethoxy methylene malonate, ethyl-4-hydroxy-6-dimethylamino-7-isopropoxy-quinoline-3-carboxylate is formed; M.P. 225–230° C.

When the above process is carried out using 3-isobutoxy-4-dimethylamino aniline in place of 3-isopropoxy-4-dimethylamino aniline, there is obtained methyl - 4 - hydroxy-6-dimethylamino - 7 - isobutoxy-quinoline - 3 - carboxylate; M.P. 278–279° C. When diethylethoxy methylene malonate is used in place of dimethylmethoxy methylene malonate in the process immediately hereinabove described, ethyl-4-hydroxy-6-dimethylamino - 7 - isobutoxy-quinoline-3-carboxylate having a melting point of 264–265° C. is obtained. Similarly, the methyl and ethyl esters of 4-hydroxy-6-dimethylamino - 7 - ethoxy-quinoline-4-carboxylate are obtained from 3-ethoxy-4-dimethylamino aniline.

Methyl 4-hydroxy-6-diethylamino - 7 - isopropoxy-quinoline-3-carboxylate, methyl 4-hydroxy - 6 - dimethylamino - 7 - isobutoxy - quinoline - 3 - carboxylate, and 4-hydroxy - 6 - lipropylamino - 7 - propoxy-quinoline-3-carboxylate are obtaind by reacting dimethyl methoxymethylene malonate with 3-isopropoxy - 4 - diethylamino aniline, 3-isobutoxy - 4 - diethylamino aniline, and 3-n-propoxy - 4 - dipropylamino aniline, and heating the resulting acid by the above-stated procedure.

EXAMPLE 2

Methyl 4-hydroxy-6-dimethylamino-7-(α,α,β-trifluoro-β-chloroethoxy)-quinoline-3-carboxylate (A) A mixture of 77 g. of 2-amino-5-nitrophenol and 6.8 g. of sodium methoxide in 250 ml. of dimethylformamide is cooled and 75 g. of chlorotrifluorethylene added. This mixture is then heated in a bomb at 80–100° C. for 5 hours. The reaction mixture is then poured into 3 l. of ice water; a yellow solid separates. The solid is removed by filtration and washed with water. It is recrystallized from aqueous methanol to give 3-(α,α,β-trifluoro-β-chloroethoxy)-4-amino-nitrobenzene, M.P. 110–112° C.

(B) A suspension of 67.5 g. of the amine produced in Part A above in 85 ml. of concentrated hydrochloric acid and 85 ml. of water is cooled to 0–5° C. while a solution of 17 g. of sodium nitrite in 35 ml. of water is added dropwise. Stirring is continued for thiry minutes, and the cold solution is then filtered. The filtrate is added rapidly to a well-stirred solution of 25 g. of cuprous chloride in 100 ml. of concentrated hydrochloric acid cooled in an ice bath. The resulting mixture is stirred for 15 hours in the cold and then allowed to warm to room temperature. It is steam distilled and 5. liters of distillate collected. The oil that separates from the distillate is collected, dried in vacuo and distilled. The fraction distilling at 110–114° C./2 mm. is collected to give substantially pure 3-(α,α,β-trifluoro-β-chloroethoxy) - 4 - chloro-nitrobenzene.

(C) A solution of 6.8 g. of the chloro compound of Part B above in 50 ml. of methanol is mixed with 20 g. of 25% dimethylamine in a sealed vessel at 150° C. for 11 hours. At the end of this time the mixture is cooled and an equal volume of water added. Yellow crystals of 3-(α,α,β-trifluoro-β-chloroethoxy) - 4 - dimethylamino-nitrobenzene separate and are collected and dried, M.P. 57–58° C.

(D) 4 g. of 3-(α,α,β-trifluoro-β-chloroethoxy) - 4 - dimethylamino-nitrobenzene is hydrogenated at room temperature in 50 ml. of methanol with 0.25 g. of 5% palladium-on-charcoal catalyst. When hydrogen uptake is complete the mixture is filtered and the filtrate evaporated to dryness to give 3-(α,α,β-trifluoro-β-chloroethoxy)-4-dimethylamino aniline. 3 g. of this substance is added without further purification to 4 g. of dimethylmethoxy methylene malonate in 30 ml. of ethanol. The resulting solution is heated for 3½ hours at 85–95° C. to give a solution of methyl α-carbomethoxy-β-[3-(α,α,β-trifluoro-β-chloroethoxy) - 4 - dimethylamino-anilino]-acrylate. The solvent is then removed by evaporation and the ester added to 180 ml. of dodecylbenzene at 250° C. and the mass heated at 250° C. for ½ hour. The mixture is then cooled and the solid filtered off and recrystalized from dry ethanol to give methyl 4-hydroxy-6-dimethylamino - 7 - (α,α,β-trifluoro-β-chloroethoxy)-quinoline-3-carboxylate, M.P. 265–266° C.

When the above process is repeated using trifluorobromoethylene and tetrafluoroethylene in the first reaction in place of chlorotrifluoroethylene, there is obtained methyl 4-hydroxy-6-dimethylamino - 7 - (α,α,β-trifluoro-β-bromoethoxy)-quinoline - 3 - carboxylate and 4 - hydroxy - 6 - dimethylamino - 7 - (α,α,β,β-tetrafluoroethoxy)-quinoline - 3 - carboxylate, respectively.

EXAMPLE 3

Methyl 4-hydroxy-6-dimethylamino-7-n-propyl-quinoline-3-carboxylate (A) A solution of 54 g. of 2-nitropropyl benzene in 500 ml. of methanol and 80 ml. of 37% formaldehyde is hydrogenated at room temperature at 40 p.s.i. using 2 g. of 5% palladium-on-charcoal as the catalyst until hydrogen uptake ceases. The catalyst is removed by filtration, and the filtrate evaporated to dryness. The residue is distilled in vacuo to give the known 2-n-propyl-N,N-dimethyl-aniline.

14 g. of sodium nitrite in 40 ml. of water is added to a cold mixture of 32.5 g. of 2,5-dichloro aniline in 120 ml. of ethanol, 84 ml. of concentrated hydrochloric acid and 250 ml. of water. To this cold diazonium solution there is added a solution of 33 g. of 2-n-propyl-N,N-dimethylaniline. The mixture is then made neutral to congo red (but acid to litmus) by the addition of solid potassium acetate. It is stirred for 15 hours and then extracted with 3×100 ml. of hexane and the combined hexane extracts evaporated to dryness to give crude 2,5-dichloro-3'-n-propyl-4'-dimethylamino azobenzene. This is purified by passing it through a column of 400 g. of based-washed aluminum oxide, and removing the product with hexane and 25% methylene chloride in hexane.

(B) A mixture of 52 g. of the above azo compound in 138 ml. of concentrated hydrochloric acid, 130 ml. of water and 120 ml. of ethanol is stirred while aluminum powder is cautiously added. The temperature is allowed to rise to 60–65° C. When about 12 g. of aluminum has been added the solution changes color from a red to a clear color. The mixture is then steam distilled to remove the dichloroaniline. When this is complete, the residue is made basic with sodium hydroxide and steam distilled again. The distillate is extracted with 3× 200 ml. of ether. The ether extracts are combined and evaporated to dryness to give 2-n-propyl-4-amino - N,N-dimethylaniline.

6 g. of 2-n-propyl-4-amino - N,N-dimethylaniline is treated with dimethyl methoxy methylene malonate, and the resulting acid ring closed in dodecylbenzene following the procedure used in Examples 1 and 2 to give methyl 4-hydroxy - 6 - dimethylamino - 7-n-propyl - quinoline-3-carboxylate, M.P. 270–275° C.

The corresponding quinolinates having an ethyl or isobutyl radical at the 7-position in place of n-propyl are obtained by carrying out the above process using 2-nitro-ethyl benzene or 2-nitro-isobutyl benzene as starting material.

The methyl and ethyl esters of 4-hydroxy-6-diethylamino-7-n-propyl-quinoline - 3 - carboxylic acid are obtained by reacting 2 - n - propyl-4-amino-N,N-diethylaniline with dimethyl or diethyl methoxymethylene malonate according to the above-described procedure.

EXAMPLE 4

Methyl-4-hydroxy-6,7-bisdimethylamino-quinoline-3-carboxylate 3,4-disdimethylaminoaniline is obtained in a known manner by hydrogenating 12 gm. of 3,4-bisdimethylamino nitro benzene in 100 ml. of methanol using 0.5 gm. of palladium-on-charcoal catalyst.

8 grams of 3,4-bisdimethylamina aniline in 80 ml. of methanol is treated with 8.5 g. of dimethylmethoxy methylene malonate. The mixture is heated on the steam bath for three hours. The solvent is then removed in vacuo leaving methyl-o-carbomethoxy - $\beta$-(3,4-dimethylamino)-aniline acrylate. This product is added to 80 ml. of dodecylbenzene at 250° C. and the mixture is maintained at this temperature for about one-half hour. The mixture is allowed to cool to room temperature and the product, methyl-4-hydroxy - 6,7 - bisdimethylamino-quinoline-3-carboxylate, crystallizes out on standing; M.P. 273° C.

When the above process is carried out and diethylethoxy methylene malonate is used in place of dimethylmethoxy methylene malonate, ethyl-4-hydroxy-6,7-bisdimethylamino-quinoline-3-carboxylate is obtained; M.P. 275–276° C.

When 3 - diethylamino-4-dimethylamino aniline and 3,4 - bis - (di - isopropylamino) - aniline is used in place of 3,4-bis - (dimethylamino)-aniline, there is obtained methyl - 4 - hydroxy-6-dimethylamino-7-diethylamino-quinoline-3 - carboxylate and methyl-4-hydroxy-6,7 - bis - (diisopropylamino) - quinoline - 3 - carboxylate, respectively.

EXAMPLE 5

Methyl-4-hydroxy-6-diethylamino-7-($\alpha,\alpha,\beta$-trifluoro-$\beta$-chloroethoxy)-quinoline-3-carboxylate 28 g. of o-nitrophenol in 75 ml. of dimethyl formamide is mixed with 1.1 g. of sodium methoxide, the mixture cooled and 30 g. of chlorotrifluoroethylene added and the resulting mixture heated in a sealed vessel for 5 hours at 100° C. It is then poured into an equal volume of water and the water extracted with three 300 ml. portions of ether. The ether extracts are combined, washed with water, aqueous sodium hydroxide and again with water. The ether extracts are then evaporated to dryness to give a residue consisting of o-($\alpha,\alpha,\beta$-trifluoro-$\beta$-chloroethoxy) - nitrobenzene. This material is hydrogenated in 800 ml. of methanol using as catalyst 1.0 g. of 5% palladium on charcoal. When hydrogen uptake ceases, the catalyst is removed by filtration and 290 ml. of triethyl phosphate added to the filtrate. The mixture is heated with stirring to 235–240° C. and then maintained at about 220° C. for three hours. It is then cooled to about 50° C. A solution of 220 g. of sodium hydroxide in 1 liter of water is added. The resulting mixture is refluxed for about 2 hours and then diluted with about 1500 ml. of water. The entire solution is extracted with five 200 ml. portions of ether. The ether extracts are combined, washed with water, dried over magnesium sulphate and then evaporated to dryness. The residue is distilled in vacuo; 2-($\alpha,\alpha,\beta$ - trifluoro - $\beta$ - chloroethoxy)-N,N-diethylaniline distills at 80–90° C./1 mm.

A mixture of 16.2 g. of 2,5-dichloroaniline in 40 ml. of concentrated hydrochloric acid and 120 ml. of water is diazotized at 0–5° C. with 1 g. of sodium nitrite in 30 ml. of water. To the resulting diazo solution there is added a solution of 28 g. of 2-($\alpha,\alpha,\beta$-trifluoro-$\beta$-chloroethoxy)-N,N-diethylaniline in 10 ml. of concentrated hydrochloric acid and 50 ml. of water. This mixture is then neutralized with solid potassium acetate until it is no longer acid to congo red paper. The mixture is allowed to stand for about 15 hours at room temperature and then it is extracted with 3× 50 ml. of ether. The ether extracts are combined and evaporated to dryness in vacuo to give a residue consisting of 2,5-dichloro-3'-($\alpha,\alpha,\beta$ - trifluoro - $\beta$ - chloroethoxy) - 4' - diethylaminoazobenzene.

Thirty g. of this diazo compound is placed in a flask with 90 ml. of concentrated hydrochloric acid, 90 ml. of water and 75 ml. of ethanol. The mixture is warmed to 60–65° C. while aluminum powder is very cautiously added. When the diazo compound is reduced the solution becomes clear with a greyish cast. This acidic mixture is then steam distilled to remove alcohol and 2,5-dichloroaniline. The residual undistilled mixture is then made basic with 50% sodium hydroxide and steam distilled again. This distillate is extracted with an equal volume of ether, and the ether extract concentrated to dryness to give a residue of 2-($\alpha,\alpha,\beta$-trifluoro-$\beta$-chloroethoxy)-3-diethylaminoaniline.

This 3,4-disubstituted aniline is added without further purification to 4.0 gm. of dimethyl methoxy ethylene malonate and the mixture heated on a steam bath for 2½ hours. It is then added to 250 ml. of dodecyl benzene at 250° C. After heating for twenty minutes the mixture is cooled. Methyl 4-hydroxy-6-diethylamino-7-($\alpha,\alpha,\beta$ - trifluoro - $\beta$ - chloroethoxy - quinoline - 3 - carboxylate precipitates and is removed by filtration. It is triturated with a small amount of acetone to give substantially pure matedial, M.P. 232–234° C.

When this process is repeated using 25 g. of 2-($\alpha,\alpha,\beta$-trifluoro - $\beta$ - chloroethoxy) - N,N - dipropylaniline as starting material, there is obtained methyl 4-hydroxy-6-dipropylamino - 7 - ($\alpha,\alpha,\beta$ - trifluoro - $\beta$ - chloroethoxy)-quinoline-3-carboxylate.

The corresponding ethyl and propyl quinolates are produced by using diethyl and dipropyl methoxy methylene malonate in place of dimethyl methoxy methylene malonate.

EXAMPLE 6

Methyl 4-hydroxy-6-diethylamino-7-($\alpha,\alpha,\beta$-trifluoro-$\beta$-chloroethoxy)-quinoline-3-carboxylate To 7.5 g. of 2-amino-5-nitrophenol in 75 ml. of dimethylformamide in a bomb tube there is added 0.5 g. of sodium methoxide. The solution is chilled and 7.5 g. of trifluorochloroethylene added. The tube is sealed and heated for five hours at 100° C. The mixture is then cooled to room temperature and added to 450 ml. of water. The aqueous mixture is extracted with 3× 150 ml. of ether. The ether extracts are combined, washed with aqueous sodium hydroxide and with water, dried over magnesium sulfate and finally evaporated to dryness to yield a residue of 3-($\alpha,\alpha,\beta$-trifluoro-$\beta$-chloroethoxy)-4-aminonitrobenzene.

20 g. of this compound is heated with 150 ml. of diethyl sulfate at 120° C. for seven hours. This mixture is then added to a stirred mixture of 250 ml. of water and 150 ml. of concentrated ammonium hydroxide. The temperature rises to 85–90° C. It is allowed to stand for 12–15 hours and then extracted with 3× 100 ml. of ether. The ether extracts are concentrated to dryness and the residue passed through an aluminum oxide chromatographic column with a 50–50 mixture of ether-hexane. The first two fractions from the column contained predominantly 3-($\alpha,\alpha,\beta$ - trifluoro-$\beta$- chloroethoxy)-4-diethylamine nitrobenzene. These fractions are evaporated to dryness, and seven grams of the residue hydrogenated in 100 ml. of methanol using 0.3 g. of palladium on charcoal as a catalyst.

When hydrogen uptake ceases the mixture is filtered and the filtrate evaporated to dryness to give 3-($\alpha,\alpha,\beta$-trifluoro - $\beta$ - chloroethoxy) - 4 - diethylamino aniline. This product is reacted with dimethyl methoxy methylene malonate as described in Example 5 to afford methyl 4-hydroxy - 6 - diethylamino - 7 - ($\alpha,\alpha,\beta$ - trifluoro - $\beta$-chloroethoxy)-quinoline-3-carboxylate, M.P. 232–234° C.

When dimethylsulfate or dipropylsulfate are used instead of diethylsulfate and the above procedure followed, the corresponding 6-dimethylamino or 6-dipropylamino quinolates are obtained.

EXAMPLE 7

A.—N,N-diethyl-2-fluoroaniline

A mixture of 100 g. of 2-fluoroaniline and 150 g. of triethylphosphate is stirred and heated to about 160° C. where there is a slight exothermic reaction. When this subsides heating is applied again and there is another exotherm at about 180° C. The mixture is then heated at 203° C. (internal temperature) for 4 hours. The mixture is cooled to room temperature and a solution of 100 g. of sodium hydroxide in 400 ml. of water is added in portions with stirring. The mixture is stirred for 12 hours. Another 500 ml. of water is then added and the resulting oil extracted with 3× 100 ml. of ether. The combined ether extracts are washed once with water, dried, then evaporated to dryness. The residue is distilled at atmospheric pressure, and N,N-diethyl-2-fluoroaniline distills as a coloress oil at 198° C. When this experiment is repeated using trimethyl phosphate or tributyl phosphate, there is obtained N,N-dimethyl - 2 - fluoroaniline and N,N-dibutyl-2-fluoroaniline, respectively.

B.—N,N-diethyl-2-fluoro-5-nitroaniline

To a solution of 60 g. of N,N-diethyl-2-fluoroaniline in 500 ml. of concentrated sulfuric acid, cooled to about 18° C., there is added a solution of 24.6 g. (16.2 ml.) of fuming nitric acid in 150 ml. of concentrated sulfuric acid over 1 hour, keeping the temperature below 19° C. The solution is then held at room temperature for 2 hours, then poured onto ice. The solution is neutralized with ammonium hydroxide with good cooling. An oil precipitates which is extracted with 3× 200 ml. of ether and the combined ether extracts are wased with 3× 150 ml. of water, the ether solution dried and then evaporated to dryness. The residue is distilled at about 0.5 mm./Hg. A small forerun of 1.5 g. boiling at 65–80° C. is discarded. The second and main fraction distills at 98° C. as an orange oil. It is substantially pure N,N-diethyl-2-fluoro-5-nitroaniline.

N,N-dimethyl-2-fluoro-5-nitroaniline and N,N-dibutyl-2-fluoro-5-nitroaniline are obtained in a similar fashion from the corresponding N,N-dialkyl-2-fluoroaniline.

C.—4-nitro-N,N′,N′-tetraethyl-o-phenylenediamine

A mixture of 21.2 g. of N,N-diethyl-2-fluoro-5-nitroaniline, 60 g. of diethylamine and 50 ml. of 50% ethanol is heated in a bomb at 155° C. for 11 hours. Most of the solvent and excess diethylamine is removed in vacuo. The residue is taken up in 50 ml. of 1:1 water-ether. The ether layer is separated, washed twice with water, dried and then evaporated to a red oil. This oil is distilled at about 0.5 mm./Hg. 4-nitro-N,N,N′,N′ - tetraethyl-o-phenylenediamine distills as a red oil at 140–142° C./0.5 mm.

When N,N - dimethyl-2-fluoro-5-nitroaniline or N,N-dibutyl-2-fluoro-5-nitroaniline are treated with diethylamine by the above procedure there is obtained N,N-dimethyl-2-diethylamino-5-nitroaniline and N,N-dibutyl-2-diethylamino-5-nitroaniline, respectively.

D.—Methyl 6,7-bis-diethylamino-4-hydroxy quinoline-3-carboxylate

A solution of 21.7 g. of 4-nitro-N,N,N′,N′-tetraethyl-o-phenylenediamine in 200 ml. of methanol is hydrogenated using 1 teaspoonful of Raney nickel as the catalyst. The calculated hydrogen pressure drop is 72 lbs. and the observed is 61 lbs. after 2 hours at room temperature. At the end of this time the catalyst is filtered off and the filtrate is treated with 17 g. of dimethylmethoxy methylene malonate. The resulting solution is heated on a steam bath for 1 hour and then evaporated to dryness in vacuo. The residue is taken up in 125 ml. of toluene and this solution evaporated to dryness in vacuo. The residue is again taken up in 125 ml. of toluene, heated on a steam bath for 30 minutes and then evaporated to dryness in vacuo. This resulting ester (an oil) is added to 400 ml. of dodecylbenzene at 250° C. The mixture is stirred and heated at 245–250° C. for 30 minutes, and then allowed to cool to room temperature. A dark gum separates. The mother liquor is decanted and the gum rubbed with ether. The ether is decanted and the gum extracted with warm acetone, this causing the gum to crystallize. The crystals are collected (M.P. 247° C., dec.), washed with hot ethanol and then recrystallized from dimethylformamide to give substantially pure methyl 6,7-bis-diethylamino-4-hydroxy quinoline-3-carboxylate (M.P. 251° C., dec.).

When the above reaction is repeated using N,N-dimethyl-2-diethylamino-5-nitroaniline or N,N-dibutyl-2-diethylamino-5-nitroaniline, there is obtained methyl 4-hydroxy - 6 - diethylamino - 7 - dimethylamino-quinoline-3-carboxylate and methyl 4-hydroxy-6-diethylamino-7-dibutylamino-quinoline-3-carboxylate, respectively.

The ethyl esters of these 4-hydroxy-6,7-dialkylamino-quinoline-3-carboxylates are produced in like manner using diethyl methoxy methylene malonate in the foregoing process instead of the dimethyl malonate.

It should be understood that although this invention has been described with reference to particular embodiments thereof, changes and modifications may be made which are within its intended scope and it should be limited only by the language of the appended claims.

We claim:

1. A compound of the formula

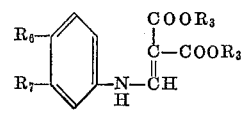

where $R_3$ ils loweralkyl; R is diloweralkylamino; and $R_7$ is diloweralkylamino, loweralkyl, alkoxy or haloalkoxy having 2–5 carbon atoms.

2. The compound of claim 1 where $R_6$ and $R_7$ are diethylamino.

3. The compound of claim 1 where $R_6$ is diethylamino and $R_7$ is n-propyl.

References Cited

UNITED STATES PATENTS 3,399,203   8/1968   Patchett et al. _____ 260—287

LORRAINE A. WEINBERGER, Primary Examiner

L. A. THAXTON, Assistant Examiner

U.S. Cl. X.R.

99—4; 260—287, 577, 999